United States Patent [19]

Brown et al.

[11] Patent Number: 5,538,264
[45] Date of Patent: Jul. 23, 1996

[54] AGRICULTURAL PLOWING VEHICLE WITH SELF-LEVELING SUSPENSION

[75] Inventors: David J. Brown, Uttoxeter; Raymond Clay, Congleton, both of United Kingdom

[73] Assignee: JCB Landpower Limited, United Kingdom

[21] Appl. No.: 465,125

[22] Filed: Jun. 5, 1995

Related U.S. Application Data

[63] Continuation of Ser. No. 856,142, Mar. 27, 1992, abandoned, which was filed as PCT/GB91/01229, Jul. 23, 1991, published as WO92/02381, Feb. 20, 1992.

[30] Foreign Application Priority Data

Jul. 28, 1990 [GB] United Kingdom ............... 9016638

[51] Int. Cl.$^6$ ........................ A01B 59/043; B60G 9/02; B60G 17/00
[52] U.S. Cl. ........................ 280/6.1; 280/6.12; 280/503; 280/688; 280/708; 280/725; 172/439
[58] Field of Search .................... 280/6.1, 6.12, 280/708, 702, 688, 707, DIG. 1, 724, 725, 726, 503, 455.1; 180/900; 172/439; 56/15.8, 15.9

[56] References Cited

U.S. PATENT DOCUMENTS

| | | | |
|---|---|---|---|
| 3,186,730 | 6/1965 | Angell | 280/6.12 X |
| 3,652,101 | 3/1972 | Pivonka | 280/6.1 |
| 3,913,938 | 10/1975 | Aikawa et al. | 280/708 X |
| 3,941,403 | 3/1976 | Hiruma | 280/708 |
| 3,945,663 | 3/1976 | Ducket | 280/708 |
| 3,945,664 | 3/1976 | Hiruma | 280/708 x |
| 3,976,302 | 8/1976 | Hammarstrand | 280/6.12 |
| 3,992,039 | 11/1976 | Hiruma | 280/708 x |
| 4,212,484 | 7/1980 | Fujii | 280/708 X |
| 4,270,771 | 1/1981 | Fujii | 280/708 X |
| 4,377,216 | 3/1983 | Ueno | 280/688 |
| 4,423,886 | 1/1984 | Taylor | 280/503 X |
| 4,462,477 | 7/1984 | Mastro | 280/704 |
| 4,639,008 | 1/1987 | Krettenauer et al. | 280/688 |
| 5,129,218 | 7/1992 | Youngberg et al. | 56/15.9 X |
| 5,271,632 | 12/1993 | Glaser et al. | 280/6.12 |
| 5,338,010 | 8/8199 | Haupt | 280/6.12 |

FOREIGN PATENT DOCUMENTS

| | | | |
|---|---|---|---|
| 0140541 | 6/1950 | Germany | 280/688 |
| 1149254 | 5/1963 | Germany | 180/900 |
| 3740406 | 2/1989 | Germany . | |
| 1370363 | 10/1974 | United Kingdom . | |
| 1420786 | 1/1976 | United Kingdom . | |
| 2035233 | 6/1980 | United Kingdom . | |
| 8201518 | 5/1982 | WIPO . | |

*Primary Examiner*—Richard M. Camby
*Assistant Examiner*—Peter C. English
*Attorney, Agent, or Firm*—Arnold, White & Durkee

[57] ABSTRACT

An agricultural vehicle, such as the type commonly known as a tractor, includes a chassis (11), a front axle (18) and a rear axle (40) suspended from the chassis (11) by a rear axle suspension (42–45). The rear axle suspension is preferably non-reactive, and preferably self-leveling. Further, a towing assembly (60) is secured to the rear axle by which a plow may be towed.

15 Claims, 5 Drawing Sheets

AGRICULTURAL PLOWING VEHICLE WITH SELF-LEVELING SUSPENSION

This application is a continuation of application Ser. No. 07/835,142, filed Mar. 27, 1992, now abandoned, which was filed as PCT/GB91/01229 on Jul. 23, 1991, published as WO92/02381 on Feb. 20, 1992.

BACKGROUND OF THE INVENTION

This invention relates to a vehicle and more particularly, but not exclusively, to a vehicle for agricultural use of the type commonly known as a tractor.

A conventional tractor employs a hitch assembly by means of which various agricultural implements such as a plough can be towed.

The tractor conventionally comprises front and rear axles which are rigid relative to a chassis of the tractor.

The propulsive force and therefore the tractive force (pull) developed by the tractor, therefore depends not only on the force that the engine of the tractor transmits to the rear driven wheels, but also on the load on those wheels. If the axle load is too small the wheels will slip and fail to grip the ground. Hence to increase the load and press the ground wheels into the ground, ballast weights are often provided at the rear, and to balance the tractor, ballast weights are sometimes carried at the front.

It will be appreciated that it would be preferred to use a lighter vehicle for such agricultural purposes to reduce compaction of the ground as the vehicle travels over it but hithertofore a satisfactory lighter vehicle has not been achieved.

Another problem with conventional tractors is that they are not ideally suited to travelling on normal roads. This is mainly because of the unsprung nature of the tractor construction.

SUMMARY OF THE INVENTION

Accordingly it is an object of the present invention to provide a new or improved vehicle particularly, but not exclusively, for use as an agricultural tractor.

According to one aspect of the invention we provide a vehicle comprising a chassis, a front axle means and a rear axle means suspended from the chassis by rear axle suspension means, the rear axle suspension means being non-reactive and there being a towing means secured to the rear axle by which an implement may be towed.

According to a second aspect of the invention we provide a vehicle comprising a chassis, a front axle means, a rear axle means suspended from the chassis by rear axle suspension means, the rear axle suspension means being a non-reactive self levelling suspension means and there being a towing means secured to the rear rigid axle means by which an implement may be towed.

In each case, the front axle suspension means may be suspended from the chassis by a non-reactive suspension.

Thus the present invention provides a vehicle which by virtue of at least the rear axle means being suspended from the chassis provides an improved ride for an operator of the vehicle and components of the vehicle compared with a conventional tractor.

Because the towing means is secured to the rear axle means and because of the non-reactive nature of the rear axle suspension means it has been found, surprisingly, that contrary to learned opinion, a vehicle with rear axle suspension means is able to perform well for towing an implement and in particular, the vehicle is well able to tow a plough.

It will be appreciated that throughout this specification the term "chassis" is intended to mean both a frame type chassis to which body panels are attached and which carries a vehicle engine and other vehicle components thereon, and a chassis which is of the body shell type in which the vehicle engine and other components are carried.

The implement the vehicle is adapted to tow, may be a plough, harrow, of any other agricultural implement, or a trailer with wheels, for examples.

By the suspension means being "non-reactive", we mean that the vertical lead on the respective ground wheels carried by the axle, and hence the traction between the ground wheels and the ground, does not significantly fluctuate in response to changes in the driving torque applied to the ground wheels.

For example, in one form of non-reactive suspension, the front and/or Fear axle suspension means may comprise a pair of links at either side of the vehicle one link of each pair being above the other relative to the ground, the links of each pair being connected at their one ends to the chassis and at their other ends to the axle means whereby there is no significant change in the vertical loading on the drive wheels in response to changes in the driving torque applied to the ground wheels. Using such a nonreactive suspension, the traction between the ground wheels and the ground, remains high as the vehicle traverses irregularities of the ground, because vertical movement of the axle, in response to irregularities in the ground, is not transmitted to the chassis.

In another type of non-reactive suspension, a pair of links are provided to one side of the vehicle, between the axle and the chassis, a single link at the other side of the vehicle, and a Panhard rod extends transversely to the three links between the axle and the chassis.

According to a third aspect of the present invention we provide a method of plouging utilising a vehicle in accordance with the first or second aspect of the invention comprising the steps of towing a plough with the vehicle, the plough being coupled to the towing means of the vehicle.

BRIEF DESCRIPTION OF THE DRAWINGS

The invention will now be described with reference to the accompanying drawings in which.

DESCRIPTION OF THE PREFERRED EMBODIMENTS

Figure 1:
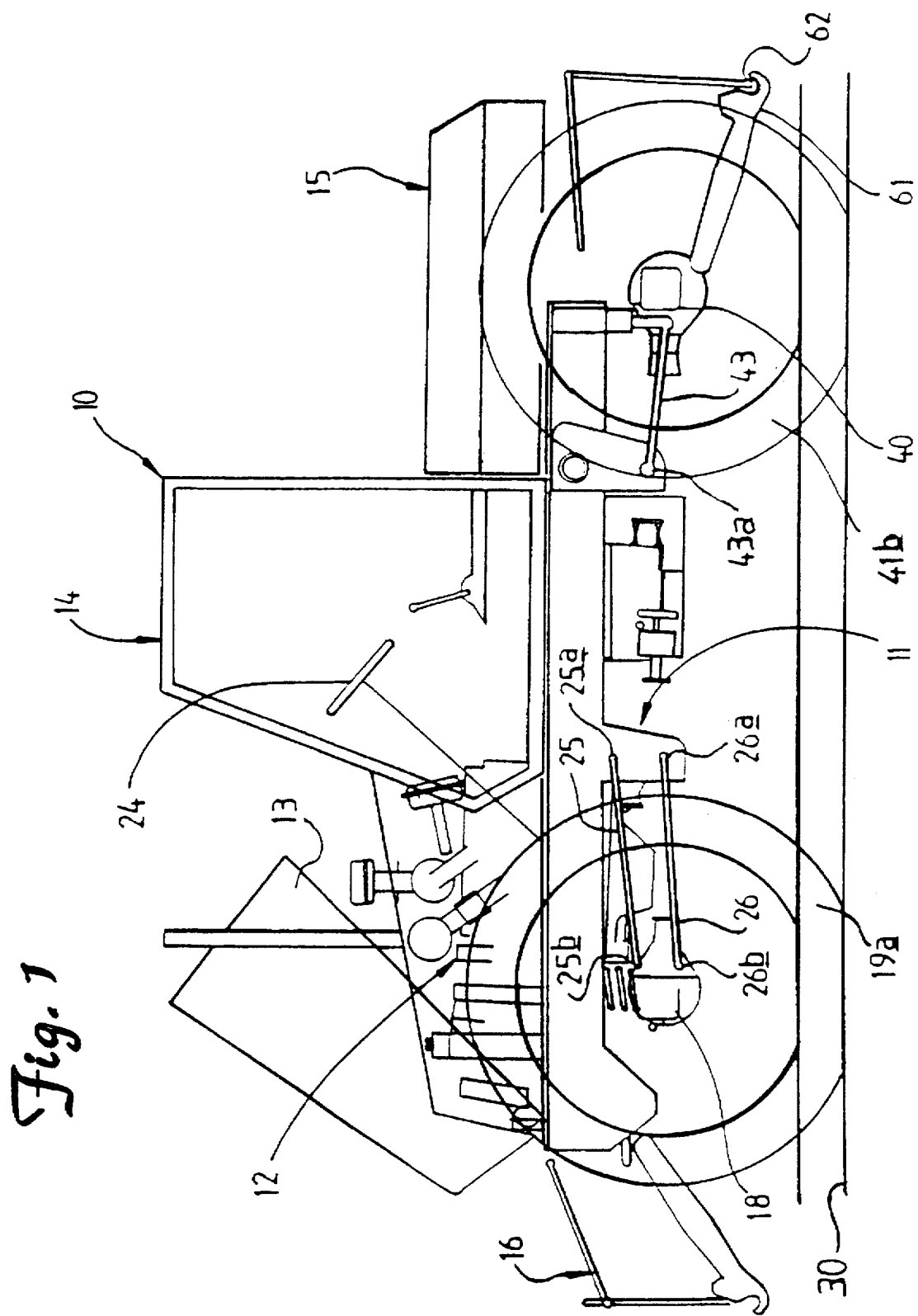
FIG. 1 is a side illustrative view of a vehicle in accordance with the invention.
Figure 2:
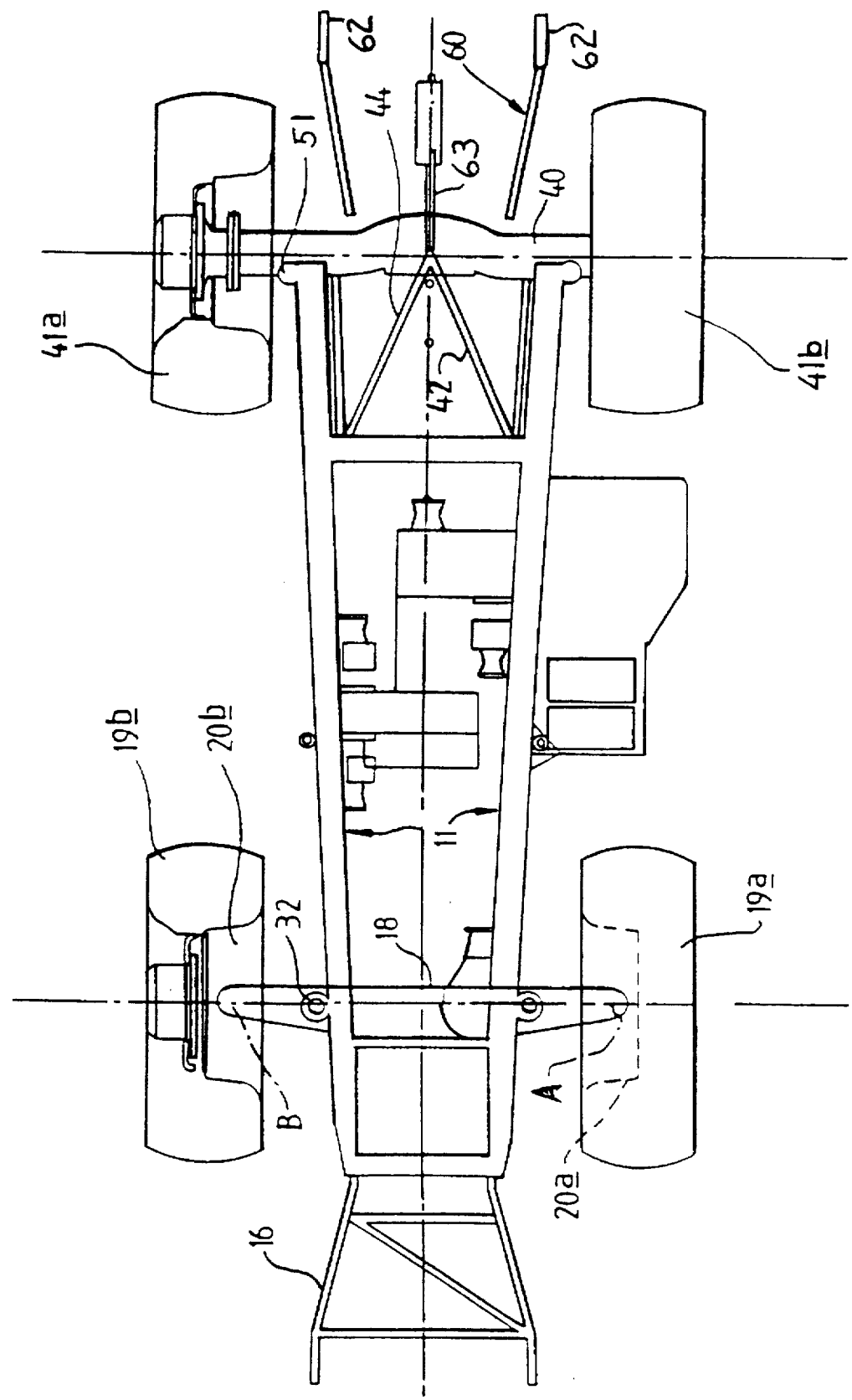
FIG. 2 is a plan view of the vehicle of FIG. 1, again shown diagrammatically.

Referring to the drawings, a vehicle 10 comprises a frame type of chassis 11 on which an engine 12 is mounted beneath a bonnet 13, a cab 14 for an operator or driver of the vehicle, and a lead platform 15 on which in use, loads may be carried is provided.

Attached to a front of the chassis 11 is a towing assembly 16 which may be of the conventional three point hitch type or any other type of towing hitch assembly as may be desired.

The hitch assembly 16 is only intended for relatively light work for example in shunting trailers.

Suspended from the chassis 11 is a front axle 18 which carries a pair of ground engaging wheels 19a,19b, one at each end.

The wheels 19a,19b are mounted on respective hubs 20a,20b which are pivotable about pivot axes A,B, respectively in mountings 21a,21b at the respective ends of the front axle 18, in response to movement of steering rods (not shown) which are connected to a steering box 23 and to the hubs 20a,20b. The hubs 20a,20b may otherwise be interconnected by a further rod (not shown) whereby the wheels 19a,19b are pivoted in generally parallel fashion by operation of a steering wheel 24 which is located in cab 14 and controls operation of the steering box 23.

Drive may be transmitted to the front wheels 19a,19b through the axle 18 as is well known in the art.

Figure 3:
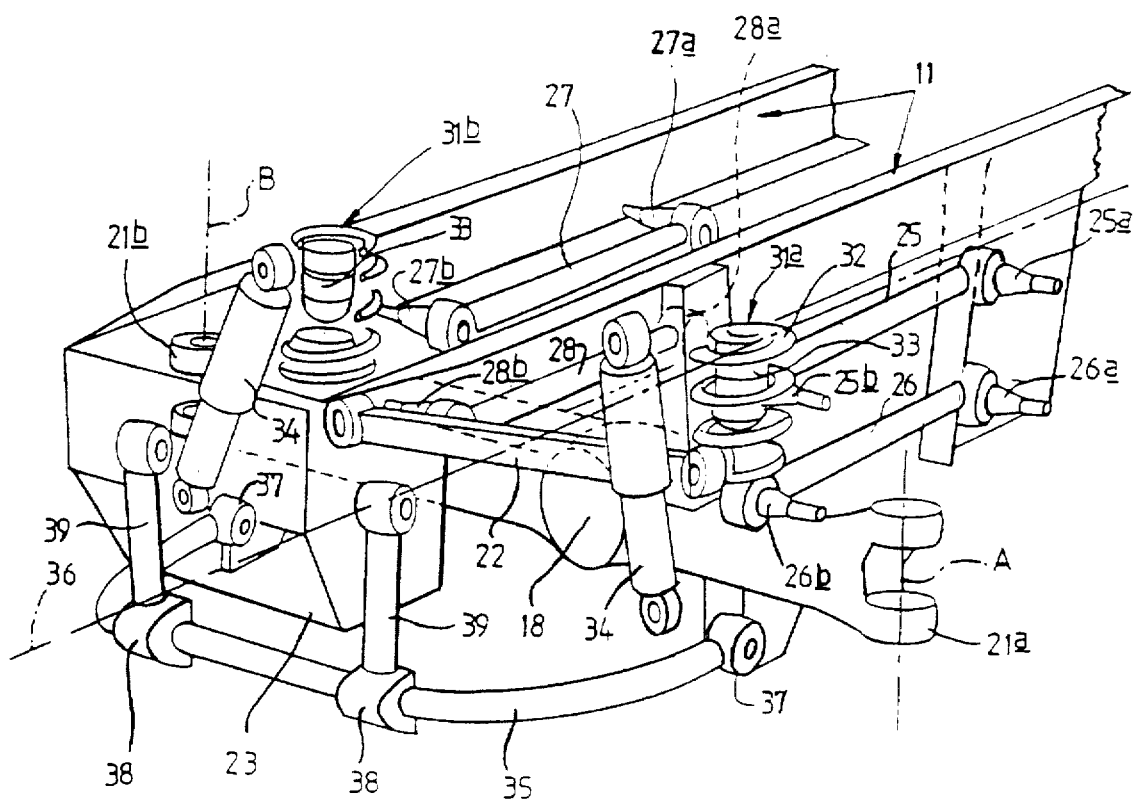
FIG. 3 is an illustrative perspective view of part of the front end of the vehicle of FIGS. 1 and 2 with various components omitted for clarity.
Figure 4:
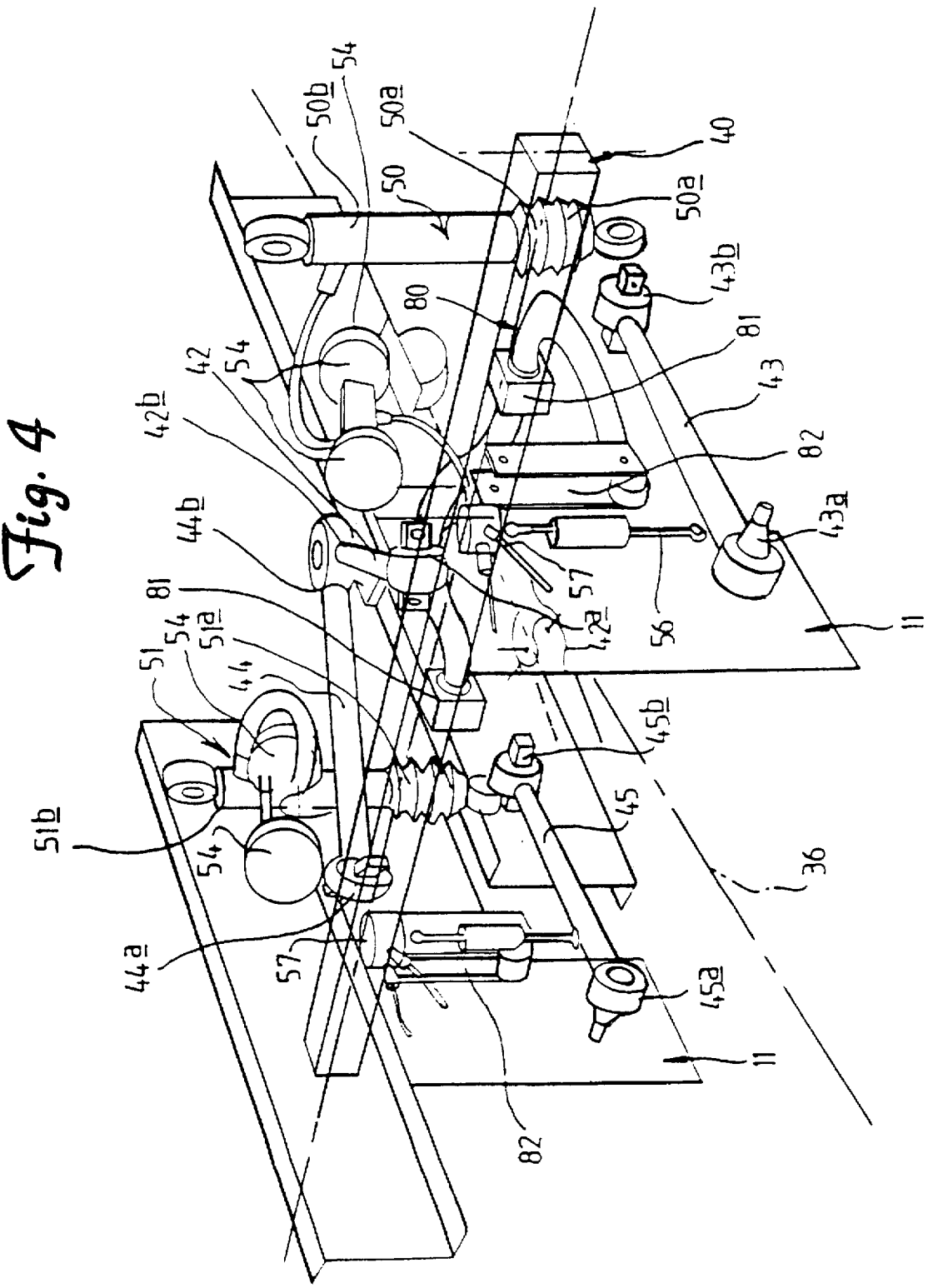
FIG. 4 is an illustrative perspective view of part of the rear end of the vehicle of FIGS. 1 and 2 with various components omitted for clarity.

The front axle 18 is connected to the chassis 11 by means of two pairs of suspension links 25,26, and 27,28. Each of the suspension links 25 to 28 are secured to the chassis 11 at their one ends 25a–28a by rubber ball joints, and at their other ends 25b–28b by further rubber ball joints to extension parts of to the front axle 18, not seen in FIG. 3.

One link 25,27 of each pair of the links 25–28 is located above the other link 26,28, of the pair, and in this example, the two links 25,26, and 27,28, of each pair extend generally parallel to one another.

By virtue of the four suspension links 25 to 28; (and a Panhard rod 22 if found necessary) a non-reactive suspension is provided for the front axle 18 in which changes in vertical loading on the ground wheels 19a and 19b, and hence loss of traction between the wheels 19a,19b and the ground 30 is minimised both as the wheels 19a,19b and hence the front axle 18 move relative to the chassis 11 as the vehicle 10 is travelling over the ground and in response to changes in drive torque transmitted to the ground wheels 19a,19b.

Coil springs 31a,31b interconnect the front axle 18 and the chassis 11, the coil springs 31a,31b each being of the type which comprise a main coil spring 32 which is relatively yielding at low loads and an auxiliary spring 33 which in this instance comprises a cushion of micro-cellular rubber which is equally stiff for all values of the lead so that the coil springs 31a,31b become increasingly stiff with increasing lead i.e. as the distance between the axle and the chassis 11 at either respective side of the vehicle 10 decreases.

A pair of shock absorbers 34 of conventional construction are also provided between the chassis 11 and the axle 18 to damp the oscillation of the coil springs 31a,31b.

An anti-roll bar 35 is provided, connected to the chassis 11 and the axle means 18, to provide resistance to movement of either side of the vehicle at the front, about a roll axis 36, the roll bar 35 being received by first mountings 37 of the axle 18 and second mountings 38 connected rigidly via links 39 to the chassis 11.

Suspended from the chassis 11 at the rear of the vehicle is a rear axle 40 which carries a pair of ground engaging wheels 41a,41b via two pairs of suspension links 42,43, and 44,45, mounted at either side of the vehicle 10 with one link 42,44 of each pair above the other link 43,45, of each pair.

The one ends 42a–45a of the links 42–45 are connected by rubber ball joints to the chassis 11 and the other ends 43b,45b of links 43,45 are also connected via respective rubber ball joints to extensions to the rear axle 40. The other ends 42b,44b of links 42,44, are interconnected and coupled to a common point at an extension to axle 40 via a rubber ball joint to provide a V formation in plan view, with the apex of the V pointing towards the rear end of the vehicle 10.

A hydraulic actuator 50,51, is provided at either side of the vehicle and the actuators 50,51 interconnect the axle 40 to the chassis 11. The hydraulic actuators 50,51, comprises a piston (concealed by rubber bellows 50a, 51a), connected to the axle 40, the pistons sliding in and out of cylinders 50b,51b such that as the distance between the chassis 11 and axle 40 decreases, hydraulic fluid is ejected from one or both of the actuators 50,51, depending on which of the ground engaging wheels 41a,41b has lifted due to irregularities in the ground 30.

However, the actuators 50,51, are each connected to a respective pair of gas springs 54 each of which contains a diaphragm so that fluid ejected from the cylinders 50b,51b, acts on one side of the diaphragm, the other sides of the diaphragms being subjected to pneumatic pressure by gas contained within the springs Thus as the wheels 41a,41b rise and fall due to e.g. irregularities in the ground, the gas springs 54 provide a cushioning effect.

However, the amount of fluid in the cylinders 50a,50b is increased and decreased depending on a height regulator means including a linkage 56 which is secured at each side of the vehicle between the link 43 or 45 and the chassis 11.

The linkages 56 each comprises a piston and cylinder arrangement, constructed so that as the link 43 for example moves as the load on the axle 40 increases, the respective linkage 56 operates on a valve 57 which allows more hydraulic fluid supplied from a pump (not shown) to be fed into the cylinders 50b,51b to extend the respective piston back to a datum position. Conversely, when the load on axle 40, decreases the link 43 will move so as to extend linkage 56 which operates valve 57 to allow hydraulic fluid to leave the respective cylinders 50b,51b so that the respective pistons are retracted back to a datum position. Hence the amount of hydraulic fluid in the respective cylinders 50b and 51b will change to extend or retract the pistons, so that the suspension will be self levelling.

Preferably a damper means is provided within the valve 57 so that the self levelling function of the suspension does not react to sudden movements of the linkages 43,45, as the vehicle is travelling, but only in response to changes in distance between the chassis 11 and the axle 40 caused as the result of, for example, the vehicle 10 cornering or more general changes in the ground surface.

The rear suspension arrangement includes an anti-roll bar 80 which is secured via mountings 81 to the rear axle, and through rigid links 82 to the chassis 11, the bar 80 providing resistance to the rear end of the vehicle rolling about axis 36.

Also attached to the rear axle 40 is a towing assembly 60 comprising a three point linkage having a pair of swinging arms 61 pivotally mounted on mountings M1 of the axle 40, which arms 61 are each provided with a hook 62 adapted to be engaged with an implement to be towed. The linkage 60 further comprises a top link 63 also intended to be coupled to an implement to be towed, the position of attachment of the top link 63 to the axle 40 being adjustable by means of a multi position mounting M2.

The towing hitch 60 further comprises a pair of control arms 65 which are pivotally mounted on a rock shaft and headstock casing assembly 66 which is fixed relative to the mounting M2. Links 68 extend between the control arms 65 and the outer ends of the swinging arms 61, and dampers 69 otherwise couple the control arms 65 to the mountings M1 of the axle 40.

Thus the swinging arms 61 can move up and down relative to the axle 40, in a controlled, damped manner.

Lateral stabilisers 70 also connect the axle 40 to the swinging arms 61 to give rigidity or at least controlled float, in a lateral direction.

Figure 5:
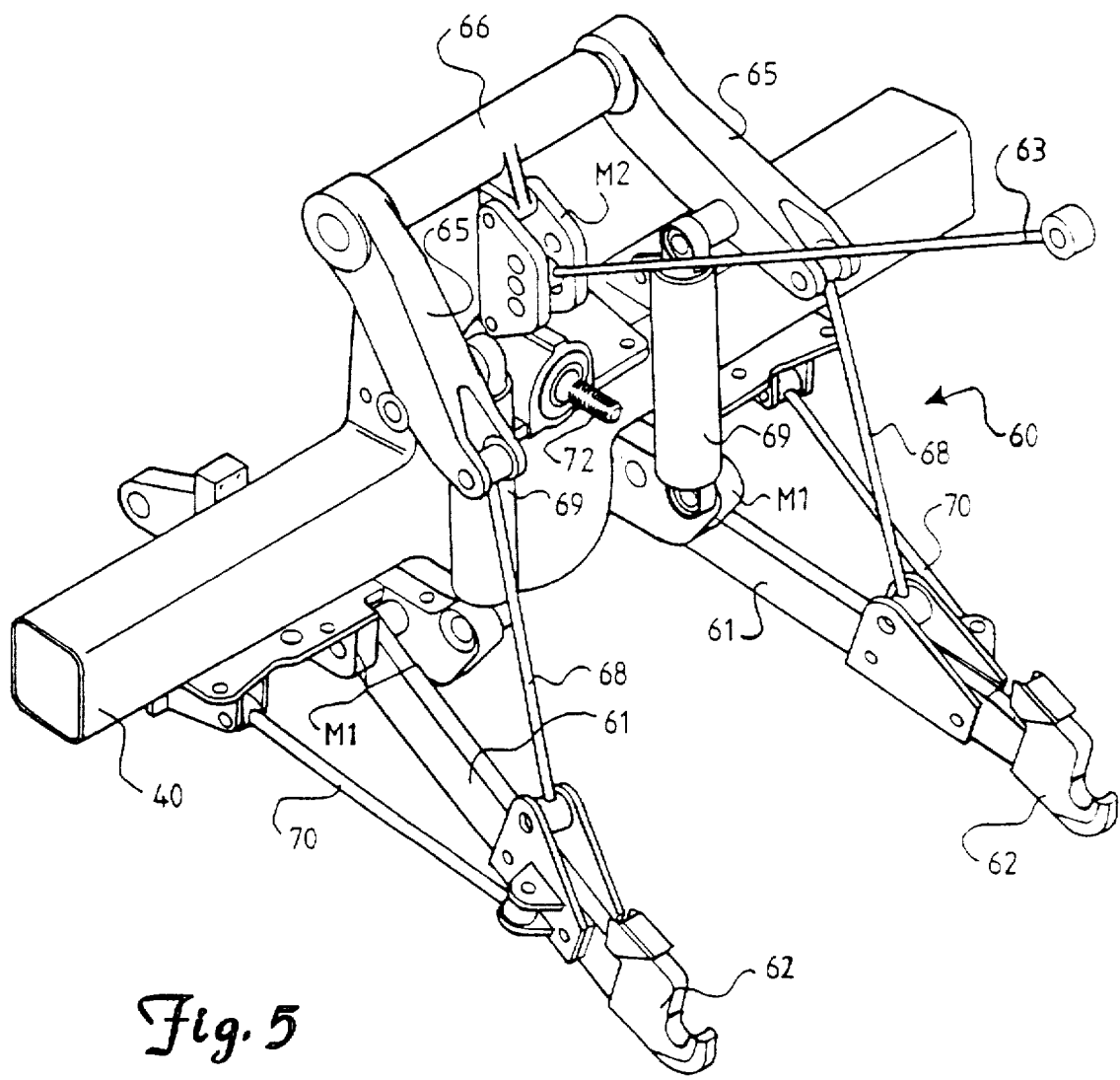
FIG. 5 is an illustrative perspective view of a three part tractor linkage secured to a rear axle means of the vehicle of FIGS. 1 to 14 with parts omitted for clarity.

In the example shown in FIG. 5, the towing hitch 60 includes a power take off 72 to enable drive to be transmitted to the appropriate machinery being towed.

The rear axle 40 suspension is thus also of the non-reactive type by virtue of the four links 42 to 45 and is self levelling by virtue of the hydropneumatic springing system used.

It has been found that the vehicle 10 is well able to travel over a conventional road surface or rough ground, without the cab 14 and other components of the vehicle being subjected to severe shock and vibration as could occur in a conventional tractor.

By virtue of the towing assembly 60 being secured direct to the rear axle 40 of the vehicle, the vehicle 10 is also able to perform satisfactorily as a towing vehicle and can tow even a plough.

Also loads can be carried on the load platform 15 of the vehicle without effecting its performance due to the self levelling nature of the rear suspension.

Hence a relatively light vehicle compared to a conventional tractor can be used for a multitude of purposes including ploughing and load transit and hence the vehicle can be considered to be a replacement for a conventional tractor in many areas. To this effect, preferably the power take off 72 provided at the rear of the vehicle enables power to be coupled to implements to be used at the rear of the tractor, such as a plough, haymaking, or other agricultural or other implement to be towed.

Because of the relative lightness of the vehicle, it may be necessary to add ballast weights at the front of the vehicle to prevent the vehicle from tipping about the axes of rotation of the rear wheels 41a,41b when the vehicle 10 is towing a heavy load such as a plough. However, even with such ballast weights fitted, the vehicle will still be considerably lighter than a conventional tractor wherein sufficient traction between the rear drive wheels and the ground is only achieved by increasing the weight of the tractor overall to an undesirable amount.

Various modifications may be made without departing from the scope of the invention. For example, the chassis 11 shown in the drawings is of the frame type i.e. plurality of body parts 13,14, the engine 12 and other vehicle components are fitted onto the chassis 11, whereas the chassis 11 could be a body shell type chassis in which the various components of the vehicle are secured.

Instead of the four link type suspension at the front and rear of the vehicle, any other suitable non-reactive type suspension may be provided.

Particularly for a four wheel drive type of vehicle, it is preferred for the front and rear axle suspension means to be of the non reactive type. Where only the rear wheels are driven an entirely different front suspension for the front axle, may be provided as desired, even a reactive suspension.

A vehicle in accordance with the first aspect of the invention need not have the self levelling spring means at the rear of the vehicle as described, but any other non-reactive type of suspension for the rear axle 40 of the vehicle may be provided.

In the vehicle shown in the drawings, the ground wheels 19a,19b, 41a,41b, are all of approximately the same size. Bigger ground wheels may be provided at the rear of the vehicle if desired.

We claim:

1. An agricultural vehicle capable of ploughing comprising:

a chassis;

a front axle assembly mounted on said chassis;

a rear axle assembly coupled to said chassis comprising an axle housing, and at least one axle shaft rotatable in the housing;

a first pair of drive wheels for transmitting driving torque to the ground, said first pair of drive wheels being coupled to said rear axle assembly;

a rear axle suspension assembly, suspending the rear axle assembly from the chassis, the rear axle suspension assembly comprising a pair of links at either side of the vehicle, one link of each pair being above the other relative to the ground, the upper link of each pair being pivotally connected at a first end to the chassis and at a second end to the housing of the rear axle assembly at a first position and the lower link of each pair being pivotally connected at a first end to the chassis and at a second end to the housing of the rear axle assembly at a second position, the second positions each being below their respective first positions, whereby there is no significant change in the vertical loading on the first pair of drive wheels in response to changes in the driving torque applied to the first pair of drive wheels;

a level sensing assembly at each side of the vehicle to sense changes in the distance between the rear axle assembly and the chassis at the respective sides caused by changes in the ground surface over which the vehicle travels, a height regulator assembly for each level sensing assembly, each height regulator assembly being responsive to the respective level sensing assembly to adjust the distance between the rear axle assembly and the chassis to return the rear axle assembly at the respective vehicle side to a datum position relative to the chassis, and;

a three point hitch by which a plough may be towed secured solely to the housing of the rear axle assembly, and comprising a pair of swinging arms pivotally mounted on the housing of the rear axle assembly, and a top link pivotally mounted on the housing of the rear axle assembly between the pair of swinging arms, each of the pair of swinging arms and top link being provided with a coupling adapted for engagement of the plough.

2. A vehicle according to claim 1, wherein the front axle assembly comprises a pair of links to one side of the vehicle, between the axle and the chassis, and a single link at the other side of the vehicle, and a Panhard rod which extends transversely to the three links between the axle and the chassis.

3. A vehicle according to claim 1 wherein the upper links are pivotally connected at their second ends to an upper surface of the housing of the rear axle assembly, and the lower links are pivotally connected at their second ends to a lower surface of the housing of the rear axle assembly.

4. A vehicle according to claim 1 wherein the upper and lower links of the rear axle suspension assembly are pivotally connected at their first ends to the chassis at positions forwardly of the vehicle from the rear axle assembly in the forward direction of travel of the vehicle.

5. A vehicle according to claim 1 wherein the axis of rotation of the drive wheels coupled to the rear axle assembly is located generally midway between the second ends of the links of each pair.

6. A vehicle according to claim 1 wherein to accommodate other components of the vehicle, the second ends of the upper links of each pair of links of the rear axle suspension assembly are connected to the housing of the rear axle assembly at a common point such that the upper links lie in a V formation, the apex of the V pointing toward the rear of the vehicle.

7. A vehicle according to claim 1 wherein the front axle assembly comprises an axle housing, and at least one axle shaft rotatable in the housing and the vehicle further comprises a second pair of drive wheels for transmitting the torque to the ground, said second pair of drive wheels being coupled to said front axle assembly and a front axle suspension assembly suspending the front axle assembly from the chassis, the front axle suspension assembly comprising a pair of links at either side of the vehicle, one link of each pair being above the other relative to the ground, the upper link of each pair being pivotally connected at a first end to the chassis and at a second end to the housing of the front axle assembly at a first position and the lower link of each pair being pivotally connected at a first end to the chassis and at a second end to the housing of the front axle assembly at a second position, the second positions each being below their respective first positions, whereby there is no significant change in the vertical loading on the second pair of drive wheels in response to changes in the driving torque applied to the second pair of drive wheels.

8. A vehicle according to claim 7 wherein the upper and lower links of the front axle suspension assembly are pivotally connected to the chassis at positions rearwardly of the front axle assembly in the forward direction of travel of the vehicle.

9. A vehicle according to claim 1 wherein damper means are provided between the front axle assembly and the chassis, the damper means comprising at each side of the vehicle a main spring which is relatively yielding at low loads, and an auxiliary spring which is equally stiff for all values of the load so that the damper means becomes increasingly stiff with increasing load.

10. A vehicle according to claim 1 wherein the height regulator assembly comprises on each side of the vehicle a fluid spring assembly comprising a fluid-operated piston and cylinder assembly and a pneumatic spring, fluid from one side of the cylinder being expelled from the cylinder as the load on the piston increases and acting on the pneumatic spring.

11. A vehicle according to claim 10 wherein the height regulator further comprises a fluid pump and on each side of the vehicle a valve assembly to increase or decrease the amount of fluid in the respective cylinder to extend or retract the respective piston to adjust the distance between the rear axle assembly and the chassis to return the piston to a datum position and hence the rear axle assembly at the respective vehicle side to a datum position relative to the chassis.

12. A vehicle according to claim 11 wherein the level sensing assembly comprises on each side of the vehicle a piston and cylinder assembly, each valve assembly being responsive to the extension of the respective piston from the respective cylinder to allow fluid to leave the respective fluid-operated piston and cylinder assembly of the height regulator assembly, and being responsive to the retraction of the respective piston into the respective cylinder to allow more fluid into the respective fluid-operated piston and cylinder assembly of the height regulator assembly from the fluid pump.

13. A vehicle according to claim 12 wherein each valve assembly comprises a damper means so that the rear axle suspension means does not react to sudden movements of the suspension links.

14. An agricultural vehicle capable of ploughing comprising:

a chassis;

a front axle assembly mounted on the chassis;

a rear axle assembly coupled to the chassis comprising an axle housing, and at least one axle shaft rotatable in the housing;

a pair of drive wheels for transmitting driving torque to the ground, the drive wheels being coupled to the rear axle assembly;

a rear axle suspension assembly, suspending the rear axle assembly from the chassis, the rear axle suspension assembly comprising first and second links at one side of the vehicle, the first link being above the second relative to the ground, the first link being pivotally connected at a first end to the chassis and at a second end to the housing of the rear axle assembly at a first position and the second link being pivotally connected at a first end to the chassis and at a second end to the housing of the rear axle assembly at a second position, the second position being below the first position, a third link on the other side of the vehicle pivotally connected at a first end to the chassis and at a second end to the housing of the rear axle assembly, the first, second and third links extending substantially longitudinally of the vehicle, and a Panhard rod pivotally connected at a first end to the chassis and at a second end to the housing of the rear axle assembly and extending substantially transversely of the vehicle;

a level sensing assembly at each side of the vehicle to sense changes in the distance between the rear axle assembly and the chassis at the respective sides caused by changes in the ground surface over which the vehicle travels, a height regulator assembly for each level sensing assembly, each height regulator assembly being responsive to the respective level sensing assembly to adjust the distance between the rear axle assembly and the chassis to return the rear axle assembly at the respective vehicle side to a datum position relative to the chassis, and;

a three point hitch by which a plough may be towed secured solely to the housing of the rear axle assembly, and comprising a pair of swinging arms pivotally mounted on the housing of the rear axle assembly, and a top link pivotally mounted on the housing of the rear axle assembly between the pair of swinging arms, each of the pair of swinging arms and top link being provided with a coupling adapted for engagement of the plough.

15. A method of ploughing using a vehicle comprising:

a chassis;

a from axle assembly mounted on said chassis;

a rear axle assembly coupled to said chassis comprising an axle housing, and at least one axle shaft rotatable in the housing;

a first pair of drive wheels for transmitting driving torque to the ground, said first pair of drive wheels being coupled to said rear axle assembly;

a rear axle suspension assembly, suspending the rear axle assembly from the chassis, the rear axle suspension assembly comprising a pair of links at either side of the vehicle, one link of each pair being above the other relative to the ground, the upper link of each pair being pivotally connected at a first end to the chassis and at a second end to the housing of the rear axle assembly at a first position and the lower link of each pair being pivotally connected at a first end to the chassis and at a second end to the housing of the rear axle assembly at a second position, the second positions each being below their respective first positions, whereby there is no significant change in the vertical loading on the first pair of drive wheels in response to changes in the driving torque applied to the first pair of drive wheels;

a level sensing assembly at each side of the vehicle to sense changes in the distance between the rear axle assembly and the chassis at the respective sides caused by changes in the ground surface over which the vehicle travels, a height regulator assembly for each level sensing assembly, each height regulator assembly being responsive to the respective level sensing assembly to adjust the distance between the rear axle assembly and the chassis to return the rear axle assembly at the respective vehicle side to a datum position relative to the chassis, and;

a three point hitch by which a plough may be towed secured solely to the housing of the rear axle assembly, and comprising a pair of, swinging arms pivotally mounted on the housing of the rear axle assembly, and a top link pivotally mounted on the housing of the rear axle assembly between the pair of swinging arms, each of the pair of swinging arms and top link being provided with a coupling adapted for engagement of the plough;

the method comprising the steps of towing a plough with the vehicle, the plough being coupled to said three point hitch.

* * * * *